June 30, 1959      E. E. HARDESTY      2,892,922
RESISTANCE WELDING METHODS AND APPARATUS
Filed March 26, 1957      2 Sheets-Sheet 1

INVENTOR
ETHRIDGE E. HARDESTY
BY
his ATTORNEYS.

June 30, 1959     E. E. HARDESTY     2,892,922

RESISTANCE WELDING METHODS AND APPARATUS

Filed March 26, 1957     2 Sheets-Sheet 2

INVENTOR
ETHRIDGE E. HARDESTY

BY
Brumbaugh, Free, Graves & Donohue
his ATTORNEYS.

United States Patent Office 2,892,922
Patented June 30, 1959

2,892,922
RESISTANCE WELDING METHODS AND APPARATUS

Ethridge E. Hardesty, Pine Valley, Calif., assignor to Fairchild Engine and Airplane Corporation, Hagerstown, Md., a corporation of Maryland Application March 26, 1957, Serial No. 648,551

8 Claims. (Cl. 219—87)

This invention relates to resistance welding of metal sheets in which forging is required to effect efficient weldments.

In many resistance welding applications involving sheet materials, forging is necessary to produce weldments containing sufficient metal to afford a desired strength. For example, in welding honeycomb sandwich a pair of outer metal sheets or skins must be welded to the edges of honeycomb core formed of thin metal strips. In this process, forging occurs to a perceptible extent when the pieces are joined effectively.

Honeycomb sandwich has been welded by utilizing wheel electrodes which, due to the forging between the outer skins and the core, results in deformation and ridging of the outer sandwich surfaces, the resulting stresses causing an undulating surface and wrinkled areas.

The present invention overcomes the disadvantages of the previous welding methods by disposing on opposite sides of a structure to be welded, for example, honeycomb sandwich, welding electrodes at least one of which includes relatively movable segments separated by insulator sheets. Engaging the segments are pressure means that exert pressure on the sandwich through the movable segments. Timed welding pulses supplied to the electrode segments in succession weld the sandwich elements together, the pressure means displacing the electrode segments in succession during the welding cycle to forge the sandwich and provide efficient and strong weldments.

In a preferred embodiment of the invention, segmented electrodes are disposed on both sides of the structure to be welded, timed welding pulses being supplied to corresponding segments in the two electrodes in sequence.

These and further advantages of the invention will be more readily understood when the following description is read in connection with the accompanying drawings, in which.

Figure 1:
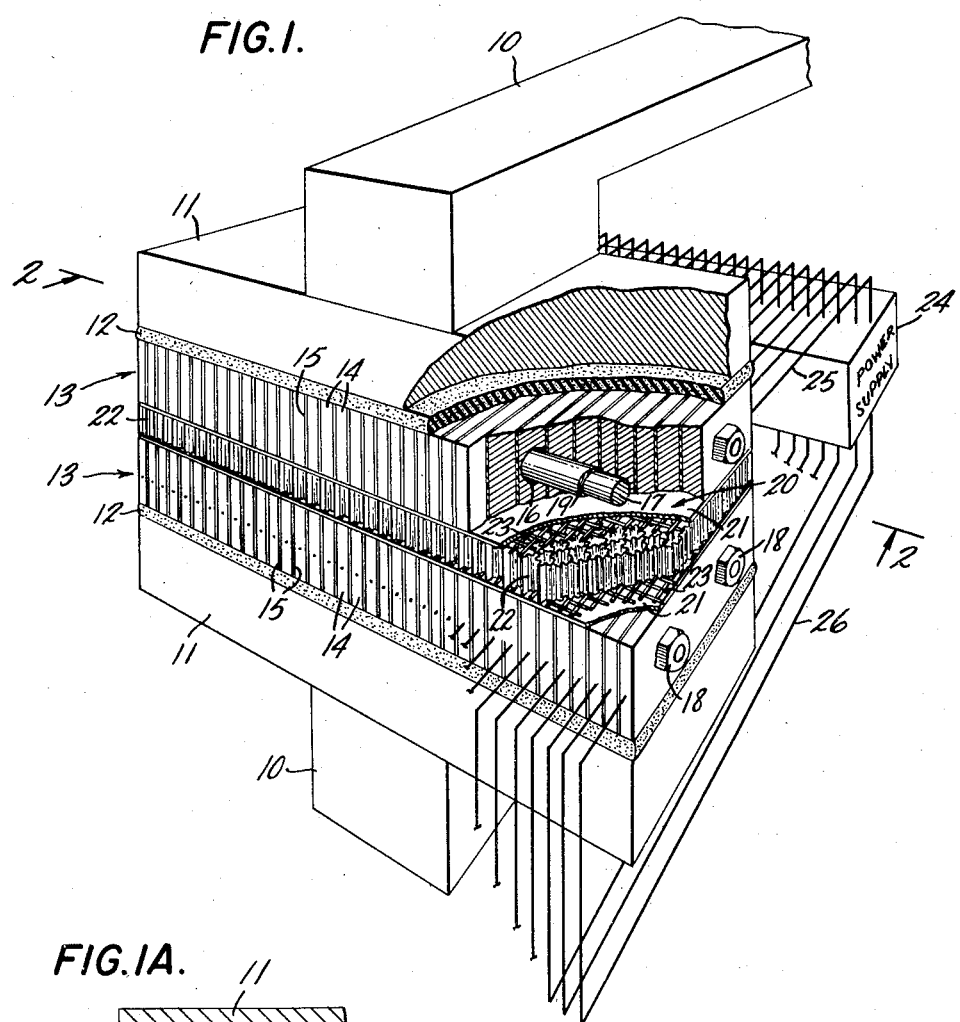
Figure 1 is a view in perspective, partially broken away, of typical welding apparatus in accordance with the present invention.
Figure 1A:
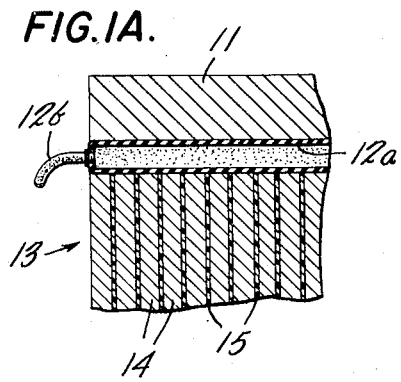
Figure 1A is a partial section of a modified pressure element for use in the apparatus of Figure 1.
Figure 2:
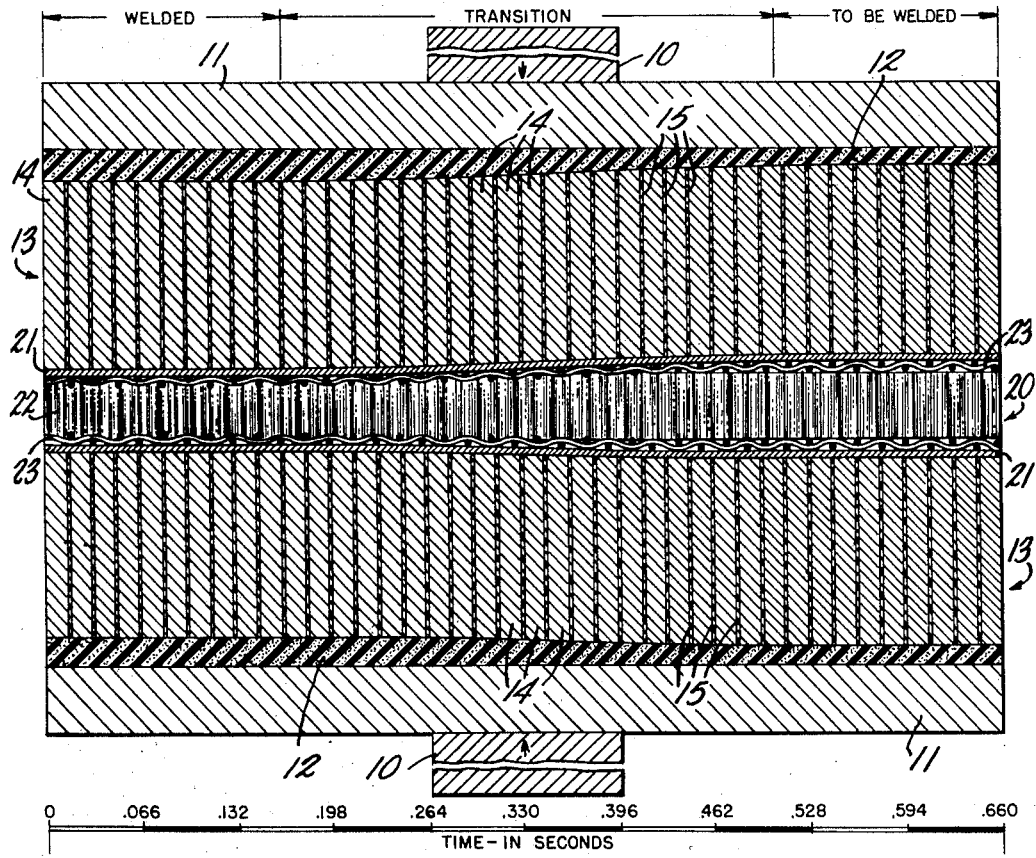
Figure 2 is a longitudinal section of the apparatus of Figure 1 taken generally along the view line 2—2 looking in the direction of the arrows.

Referring to an illustrative embodiment of the present invention in greater detail with particular reference to Figures 1 and 2, a pair of arms 10 clamp the structure to be welded by means of platens 11. Flexible resilient pads 12 under the platens 11 are compressed upon the application of clamping pressure and may take the form, as shown, of rubber pads. However, other elements capable of storing mechanical energy such as an inflated bladder arrangement, as shown in Figure 1A and discussed hereinafter, may be utilized. In this instance, a fluid or gas would be used separately or with clamping means to furnish mechanical pressure to the welding apparatus.

Electrodes 13 are disposed in engagement with the resilient pads 12, each of the electrodes being formed by a plurality of conductive bars 14 separated by insulator sheets 15. Oversized openings 16 in the bars 14 and insulators 15 receive tie rods 17, which serve to support the electrode stack, when it is lifted, in a suitable bundle. Nuts 18 threaded on the tie rods 17 secure the electrode assembly, insulation 19 on the rods 17 preventing current leakage between the bars 14.

When the clamps 10 are forced together, the pads 12 are compressed and constantly urge corresponding electrode segments 14 in electrodes 13 toward each other. This same action may also be accomplished by utilizing a bladder 12a (Figure 1A), formed of a suitable material such as a rubber or a plastic, which may be inflated through a tube 12b. Thus, the platens 11 need only be held in one position and a liquid or gas pumped into the bladder 12a to urge the electrodes 13 together.

The electrodes 13 may be formed to any desired configuration in order to conform to the shape of the structure that must be welded. For example, matching concave and convex electrodes may be used to form curved structures, the electrode bars 14 being suitably shaped for any particular configuration.

The electrode bars 14 may be formed of any suitable electrode material such as pure wrought copper, or any one of the commercial erosion-resistant copper alloys. In further connection with the electrodes 13, the insulator sheets or dividers 15 must provide insulation between the bars 14 and, in addition, must not substantially inhibit relative sliding movement between adjacent bars. It has been found that insulator dividers 15 formed of "Teflon" (tetrafluoroethylene) make satisfactory elements.

Positioned between the electrodes 13 is a honeycomb sandwich 20 formed by a pair of metal facing sheets or skins 21 abutting a honeycomb core 22 formed of thin metal strips suitably welded to provide a cellular structure. Preferably, a metal mesh 23 is provided between the skins 20 and 21 and the core 22 to assist in the formation of strong and efficient weldments. For example, the honeycomb sandwich may incorporate the improvements disclosed in copending applications Serial No. 474,863, filed December 12, 1954, now Patent No. 2,814,717, Serial No. 475,137 filed December 14, 1954, Serial No. 535,463 filed September 20, 1955, now Patent No. 2,810,816, and Serial No. 602,774 filed August 8, 1956, now Patent No. 2,814,718, and assigned to the assignee of the present application.

A power supply 24 (Figure 1) supplies welding current pulses respectively through conductors 25 and 26 to electrode bars 14 in the upper and lower electrodes 13, such current pulses being applied sequentially to adjacent electrode bars 14, as will be explained in greater detail hereinafter.

In a typical operation of the welding apparatus illustrated in Figures 1 and 2, the honeycomb sandwich 20 must be welded, such welding being accompanied by substantial forging which provides efficient and strong weldments but decreases the sandwich thickness perceptively. Previous welding methods utilizing wheels and rollers ridged the skins 21 due to the localized depressions formed as the wheel progressed along the sandwich. Such deformation of the surface sheet impaired the strength and provided undulating and wrinkled surfaces on the resulting sandwich structure.

In accordance with the invention, referring to Figure 2 welding current pulses are supplied to successive bars 14 from left to right in accordance with a time scale below the apparatus. As indicated on the left end of the sandwich 20, complete welding has occurred. Therefore, the pressure pads 12 have expanded and in doing so, the sandwich 20 has been forged together to provide weldments between the skins 21 and the core 22.

The center or transition section of the sandwich 20 indicates clearly the action of the pressure pads 12 and the electrode bars 14, the latter's movement in response to pressure accomplishing the forging action as sequential current pulses are supplied thereto. As explained above, the oversized openings 16 receiving the rods 17 permit such relative movement of the bars 14. At the right side of the sandwich 20, the skins and core are still to be welded and the pads 12 remain compressed.

It is apparent that welding of the sandwich 20 may be accomplished at such a rate that forging may be accomplished within the transition zone, such progressive forging not affecting the surface condition of the skins 21. Moreover, with the inventive apparatus, the sandwich 20 is under sufficient pressure before, during and after welding so that an overall uniform electrical contact resistance results. Furthermore, such constant pressure restrains hot welds from springing back and breaking.

Stated in another way, the skins 21 are wiped into their final welded positions by virtue of the mechanical energy stored in the pads 12.

Preferably, corresponding electrode bars 14 of the upper and lower electrodes 13 are positioned directly above each other in order to provide the most direct path for current flow and prevent conditions which might be described as non-symmetrical electrical loading.

It may be desirable under certain conditions to employ a single segmented electrode 13 only and utilize a fixed electrode on the other side of the structure to be welded. In such instances, the energy stored in the pad 12 would serve to accomplish forging for the entire sandwich or other structure being welded.

Figure 3:
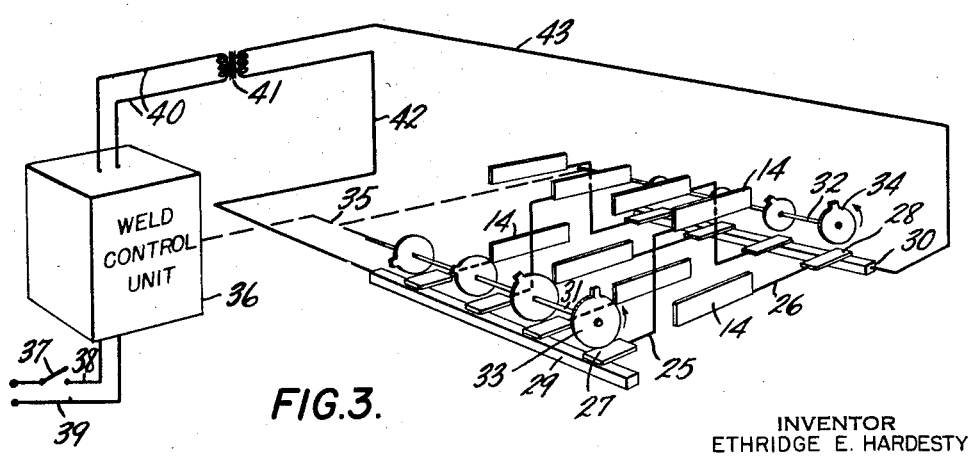
Figure 3 is a schematic circuit diagram, partially in block form, of typical control circuits that may be utilized in connection with the welding apparatus illustrated in Figure 1.

Referring next to Figure 3, which diagrammatically illustrates a system for controlling the sequential application of welding current pulses to the welding electrodes 13, the upper and lower electrode bars 14 are respectively joined by the conductors 25 and 26 to contact plate switches 27 and 28 normally spaced from bus bars 29 and 30. A pair of cam shafts 31 and 32 drive cams 33 and 34 in synchronism due to their connection to a mechanical drive linkage 35, the cams sequentially actuating the switches 29 and 30. It will be observed that the cams 33 and 34 are so related angularly on the cam shafts that the contact plate switches 27 and 28 will be closed in succession from left to right in Figure 3.

The mechanical linkage 35 is driven by a weld control unit 36 energized by input conductors 38 and 39 upon actuation of a switch 37. The weld control unit 36 supplies timed welding current pulses to the bus bars 29 and 30 through output conductors 40, a welding transformer 41, and conductors 42 and 43. The weld control unit 36 may include conventional phase shift controlled thyratrons or ignitrons for furnishing high current welding pulses in synchronism with rotation of the cam shafts 31 and 32.

In operation, closure of the switch 37 initiates a welding cycle by starting rotation of the cam shafts 31 and 32. When a pair of corresponding switches 27 and 28 are urged into contact with the bus bars 29 and 30, a high current welding pulse will be delivered to the welding transformer 41 causing a flow of current through the electrode bars 14 and the work piece therebetween. The welding pulse is terminated prior to opening of the switches 27 and 28 to minimize arcing.

Of course, the mechanical switching arrangement may be replaced by other conventional welding systems furnishing timed welding current pulses directly to the pairs of electrode bars 14, the Figure 3 arrangement being exemplary only.

It will be understood that the above-described embodiments of the invention are illustrative only and modifications thereof will occur to those skilled in the art. Therefore, the invention is not to be limited to the specific apparatus disclosed herein.

I claim:

1. Apparatus for resistance welding a pair of metal sheets to the edges of a metal core extending therebetween in which the welded members are forged together to provide weldments comprising electrodes engaging the metal sheets, at least one of the electrodes being formed of electrically conductive metal segments separated by insulators, means holding the segments and insulators in operative relation with the segments relatively movable to enable them to forge the sheets together, flexible resilient means engaging the outer side of the segmented electrode, means to place the electrodes and resilient means under pressure to urge the sheets against the core, and means to supply timed welding current pulses to the electrode segments and to the other electrode in succession to weld the sheets to the core.

2. Apparatus as defined in claim 1, wherein the resilient means comprises a compressible pad.

3. Apparatus as defined in claim 1, wherein the resilient means comprises an inflatable bladder.

4. Apparatus for resistance welding a pair of metal sheets to the edges of a metal core extending therebetween in which the welded members are forged together to provide weldments comprising electrodes engaging the metal sheets, each of said electrodes being formed of electrically conductive segments separated by insulators, means holding the segments and insulators in operative relation with the segments relatively movable to enable them to forge the sheets together, flexible resilient means engaging the outer sides of the segmented electrodes, means to place the electrodes and resilient means under pressure to urge the sheets against the core, and means to supply timed welding current pulses to corresponding segments in the two electrodes in succession to weld the sheets to the core.

5. Apparatus as defined in claim 4, wherein the resilient means comprises a compressible pad.

6. Apparatus as defined in claim 4, wherein the resilient means comprises an inflatable bladder.

7. In resistance welding apparatus, a welding electrode comprising a plurality of segments having flat parallel opposed faces, insulator sheets between the adjoining segment faces, and means holding the segments and sheets in operative relation with the segments relatively movable.

8. In resistance welding apparatus, a welding electrode comprising a plurality of segments having flat parallel opposed faces, insulator sheets between the adjoining segment faces, at least one series of aligned openings through the segments and insulator strips, and a rod smaller than the openings extending therethrough to hold the segments and sheets in operative relation with the segments relatively movable in directions perpendicular to the axis of the rod.

References Cited in the file of this patent

UNITED STATES PATENTS

| | | |
|---|---|---|
| 1,754,948 | Hatch | Apr. 15, 1930 |
| 1,918,226 | Gilbert | July 11, 1933 |
| 2,056,563 | Budd et al. | Oct. 6, 1936 |
| 2,109,461 | Brown | Mar. 1, 1938 |
| 2,250,617 | Argentin | July 29, 1941 |
| 2,266,424 | Humphrey | Dec. 16, 1941 |
| 2,796,510 | Herbert | June 18, 1951 |